US012703995B2

(12) United States Patent
Pereo Arvayo et al.

(10) Patent No.: US 12,703,995 B2
(45) Date of Patent: Aug. 11, 2026

(54) RETURN SPRING ASSEMBLY FOR A LOCK

(71) Applicant: ASSA ABLOY Access and Egress Hardware Group, Inc., New Haven, CT (US)

(72) Inventors: Gerado Pereo Arvayo, West Haven, CT (US); David Martinez Diaz, Tlaquepaque (MX); Andrew S. Geraci, Middlefield, CT (US); Marisol Mael Lara Gomez, Guadalajara (MX)

(73) Assignee: ASSA ABLOY Access and Egress Hardware Group, Inc., New Haven, CT (US)

( * ) Notice: Subject to any disclaimer, the term of this patent is extended or adjusted under 35 U.S.C. 154(b) by 45 days.

(21) Appl. No.: 18/394,518

(22) Filed: Dec. 22, 2023

(65) Prior Publication Data

US 2024/0240493 A1 Jul. 18, 2024

Related U.S. Application Data

(60) Provisional application No. 63/438,914, filed on Jan. 13, 2023.

(51) Int. Cl.
*E05B 3/06* (2006.01)

(52) U.S. Cl.
CPC .................................... *E05B 3/065* (2013.01)

(58) Field of Classification Search
CPC ....................................................... E05B 3/065
USPC .......................................... 292/336.3; 70/224
See application file for complete search history.

(56) References Cited

U.S. PATENT DOCUMENTS 5,046,772 A * 9/1991 Su ........................... E05B 3/065 292/336.5
5,067,758 A * 11/1991 Fann ....................... E05B 3/065 292/347
5,125,696 A * 6/1992 Robida ................... E05B 63/04 292/DIG. 61
5,529,354 A * 6/1996 Studt ....................... E05B 3/065 292/336.3
5,564,296 A * 10/1996 Theriault .............. E05B 55/005 292/357
5,605,064 A * 2/1997 Katayama ............. E05B 13/108 292/336.3
5,617,749 A * 4/1997 Park ........................ E05B 3/065 292/336.3
5,666,833 A * 9/1997 Gao ........................ E05B 3/065 292/336.3
6,101,856 A * 8/2000 Pelletier ................ E05B 13/101 70/472
6,279,360 B1 * 8/2001 Shen ......................... E05B 3/06 292/357

(Continued)

FOREIGN PATENT DOCUMENTS

EP 4124707 A1 * 2/2023 ........... E05B 15/006

*Primary Examiner* — Kristina R Fulton
(74) *Attorney, Agent, or Firm* — Wolf, Greenfield & Sacks, P.C.

(57) ABSTRACT

A return spring assembly for a door handle of a door lock is provided. According to some embodiments, the return spring assembly may include a spring cartridge and a hub plate. The hub plate may be removably connected to the spring cartridge and configured to rehand the lock by reorienting the hub plate on the spring cartridge. A method of rehanding such a lock is also provided.

26 Claims, 12 Drawing Sheets

(56) References Cited

U.S. PATENT DOCUMENTS

| | | | | |
|---|---|---|---|---|
| 6,386,602 | B1 * | 5/2002 | Lan | E05B 3/065 292/357 |
| 7,137,657 | B2 * | 11/2006 | Wu | E05B 15/02 292/357 |
| 8,051,689 | B1 * | 11/2011 | Shen | E05B 47/068 70/279.1 |
| 8,746,760 | B2 * | 6/2014 | Chen | E05B 3/065 292/357 |
| 8,844,330 | B2 * | 9/2014 | Moon | E05B 55/005 292/336.3 |
| 2004/0074269 | A1 * | 4/2004 | Lee | E05B 13/101 70/472 |
| 2004/0201230 | A1 * | 10/2004 | Wu | E05B 15/02 292/357 |
| 2007/0182164 | A1 * | 8/2007 | Baser | E05B 7/00 292/173 |
| 2008/0307836 | A1 * | 12/2008 | Kim | E05B 3/065 70/91 |
| 2010/0139335 | A1 * | 6/2010 | Constantinou | E05B 63/006 292/336.5 |
| 2012/0235429 | A1 * | 9/2012 | Chen | E05B 3/065 292/357 |
| 2013/0229021 | A1 * | 9/2013 | Wang | E05B 3/065 292/336.3 |
| 2013/0234453 | A1 * | 9/2013 | Murphy | E05B 3/065 292/226 |
| 2014/0159392 | A1 * | 6/2014 | Tsai | E05B 63/16 292/336.3 |
| 2015/0015003 | A1 * | 1/2015 | Tsai | E05B 3/065 292/336.3 |
| 2017/0101805 | A1 * | 4/2017 | Mitchell | E05B 15/02 |
| 2022/0064989 | A1 * | 3/2022 | Chen | E05B 17/046 |
| 2022/0325556 | A1 * | 10/2022 | Mohammed | E05B 15/0013 |
| 2022/0356731 | A1 * | 11/2022 | Leites | E05B 3/065 |
| 2024/0240493 | A1 * | 7/2024 | Pereo Arvayo | E05B 3/065 |

* cited by examiner

RETURN SPRING ASSEMBLY FOR A LOCK

CROSS-REFERENCE TO RELATED APPLICATIONS

This application claims the benefit under 35 U.S.C. § 119(e) to U.S. Provisional Application No. 63/438,914, entitled "RETURN SPRING ASSEMBLY FOR A LOCK" and filed Jan. 13, 2023, which is herein incorporated by reference in its entirety.

FIELD

The present disclosure relates generally to locks and to door handle return spring assemblies for door locks.

BACKGROUND

Aspects described herein relate to improvements in door locks. A door lock (also known as a lock) may be applied to a door to allow a user to unlatch the door by turning the door handle. Some door locks additionally allow the user to place the lock in a locked state, where turning or attempting to turn the door handle will not unlatch the door until the user presents a key or other credential to put the lock in an unlocked state.

SUMMARY

According to one aspect, a return spring assembly for a door handle of a door lock comprises a cartridge base configured to rotate with the door handle, a spring retained by the cartridge base, and a hub plate configured to mount rigidly with the cartridge base in one of a first orientation or a second orientation. With the hub plate mounted in the first orientation, a force exerted by the spring increases when the door handle is rotated in a clockwise direction. With the hub plate mounted in the second orientation, a force exerted by the spring increases when the cartridge door handle is rotated in a counterclockwise direction.

According to another aspect, a lock comprises a door handle configured to rotate about an axis, a case configured to mount on a door and to rotatably support the door handle, a spindle engaged with the door handle and configured to rotate therewith, a spring cartridge, and a hub plate removably connected to the spring cartridge and configured to engage with the spindle and rotate therewith. The case additionally comprises a stop configured to contact the hub plate at certain rotational positions of the hub plate to limit a rotational displacement of the door handle. The hub plate may be removably connected to the spring cartridge in a first orientation or in a second orientation. When the hub plate is removably connected to the spring cartridge in the first orientation, the door handle is configured to rotate about the axis in a first direction to unlatch the lock. When the hub plate is removably connected to the spring cartridge in the second orientation, the door handle is configured to rotate about the axis in a second direction to unlatch the lock. The first direction is different from the second direction.

According to another aspect, a lock comprises a door handle configured to rotate about an axis, a stop configured to limit a rotation of the door handle about the axis, and a return spring assembly configured to provide a force resisting the rotation of the door handle about the axis. The return spring assembly further comprises a spring, a cartridge base connected to rotate with the door handle and configured to support the spring, and a hub plate connected to rotate with the cartridge base and configured to abut the stop to limit the rotation of the door handle. The hub plate has a right hand orientation configured to put the lock in a right hand lock configuration when the hub plate is installed to abut the stop in the right hand orientation. The hub plate has a left hand orientation configured to put the lock in a left hand lock configuration when the hub plate is installed to abut the stop in the left hand orientation. In a right hand lock configuration, a user unlatches the lock by rotating the door handle about the axis in a clockwise direction and in a left hand lock configuration, a user unlatches the lock by rotating the door handle about the axis in a counter-clockwise direction.

According to another aspect, a method for rehanding a lock is provided. The method comprises removing a hub plate from a cartridge base, the hub plate being initially attached in a first orientation; reinstalling the hub plate to the cartridge base, the hub plate being reinstalled in a second orientation different from the first orientation; detaching the door handle from the cartridge base; moving the door handle from a first position to a second position different from the first position; and reattaching the door handle to the cartridge base.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
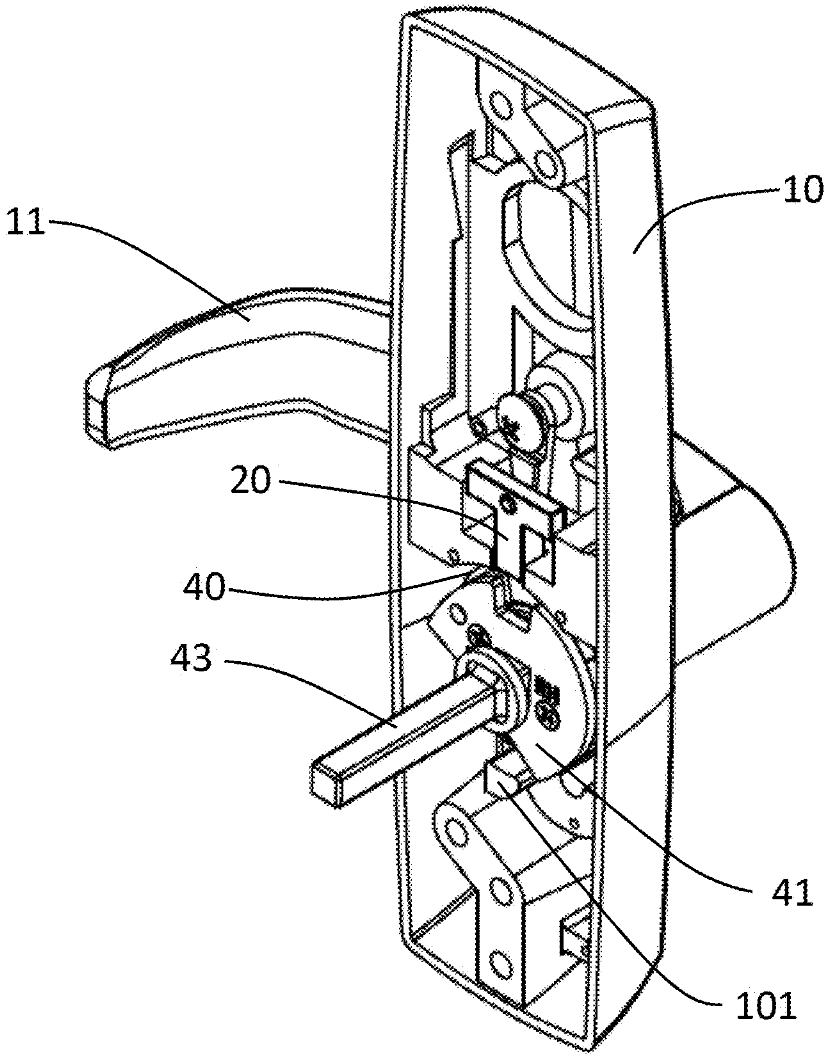
FIG. 1 shows in interior facing perspective view of a lock according to one embodiment.

When a user faces a door, the door may be hinged on either of the left edge of the door or the right edge of the door, so that the user may swing the door to the left, or to the right, respectively to open it. Opening the door may require unlatching the door such as by rotating a door handle on a door lock to unlatch the door. The user may provide a rotational force on the door handle to counteract a restoring force provided by the lock to maintain the door in an unlatched condition. An unlatched door may be opened by pushing or pulling the door while holding the door handle to remain in the unlatched position. Lever type door handles may typically point toward the hinged edge of the door when they are in a free state (e.g. not being moved such as by a user). Lever type door handles may be oriented with the lever in a horizontal position in the free state. A user may unlatch a lever type door handle by pushing downward on a distal end of the door handle lever, rotating the door handle about an axis. From these scenarios it may be observed that a lever type door handle may point to a user's left side or to a user's right side that the user may rotate some handles clockwise to unlatch some doors and may rotate other handles counterclockwise to unlatch other doors.

During installation, a door lock may be selected or configured such that the handle orientation and direction of rotation are appropriate for the door on which the lock is to be installed. As used herein, configuring a lock for the orientation and direction of rotation of a door handle may be termed "rehanding" the lock. In a left hand lock configuration, the door lock is on the right side of the door (when the user/observer is facing the door) with the door handle pointing toward the hinged edge on the left side of the door. In a right hand lock configuration, the lock is on the left side of the door (when the user/observer is facing the door) with the door handle pointing toward the hinged edge on the right side of the door. A lock may be rehanded by replacing some components within the lock. To supply a lock that fits a left hand or a right hand lock configuration, a manufacturer may supply the lock with separate left and right hand components necessary to configure the lock for either hand even though only the components for one hand may be used, or the user/installer may acquire separate components to rehand the lock.

The inventors have recognized and appreciated improvements to door locks that may allow a lock to be rehanded by repositioning components within the lock. According to some embodiments, the door lock disclosed herein may be rehanded without addition, deletion, or replacement of any parts within the lock. Rehanding may be performed using tools consistent with those tools otherwise required to install the lock. Rehanding may be performed at any time and one lock may be repeatably rehanded, such as if moving an existing installed lock onto a new door of a different hand.

According to some embodiments, a lock may include a spring cartridge which may provide a restoring force to return a door handle to the position of the free state after a user releases the door handle. The spring cartridge may further include a spring to provide the restoring force and cartridge base to retain the spring and connect the spring to other components within the lock. One end of the spring may engage the cartridge base and another end of the spring may engage with a stationary support. The stationary support may be part of a case of the lock, the case serving as a chassis or frame for the components of the lock. The case may be rigidly attached to and stationary with the door. In some embodiments, a first end of the spring may engage the cartridge base in one hand (for instance right hand) and the first end of the spring may engage the stationary support in the other hand (for instance left hand). According to some embodiments, the spring may be a torsion spring such as a coiled torsion spring. Other spring types including clock springs, cantilevered beam springs, linear coil springs, and other springs are contemplated and this disclosure is not to be so limiting. Multiple springs may be used in some embodiments. The spring may be preloaded within the spring cartridge such that substantial restoring force may be available to a door handle at small handle displacements. The spring cartridge may additionally include other components, such as to retain and/or preload the spring. The spring cartridge may be installed from the lock as one unit and may reduce the difficulty of installing the spring, such as reducing the difficulty of tensioning or compressing the spring.

According to some embodiments, a lock includes a hub plate that interacts with a stop within the lock. The interaction of the hub plate and the stop may establish a range of rotational motion of the door handle, for instance one location on the hub plate abuts the stop when the door handle is in the free state and another location on the hub plate abuts the stop when the door handle is at a maximum angular displacement. Preload from the spring may apply a force between the hub plate and the stop when the handle is in the free state. In some embodiments, multiple stops interact with one or more locations on the hub plate and this disclosure is not so limiting. A stop may be formed as a separate piece from the case and may be moveable to different positions within the case, such as to adjust the range of rotational motion of the handle. According to some embodiments, a door handle may have a range of rotational motion about an axis normal to a surface of the door that is greater than 20° and less than 90°. In other embodiments, the range of rotational motion about the axis may be greater than 60°, less than 90°, or approximately 75°.

According to some embodiments, the hub plate may attach to the spring cartridge. The hub plate attached to the spring cartridge may form a return spring assembly. The hub plate and spring cartridge may be configured so that the hub plate may attach to the spring cartridge in one of two unique orientations. Each orientation may correspond with one handing of the lock. In some embodiments, the hub plate may be flipped front to back to change its orientation. For instance, a hub plate may have a first face and a second face that is opposite of the first face. The hub plate may attach to the spring cartridge by one or more screws or other fasteners. In a first orientation of the hub plate, the hub plate may be connected by screws into a first set of holes such that the first face abuts the spring cartridge. In a second orientation of the hub plate, the hub plate may be connected by screws into a second set of holes such that the second face abuts the spring cartridge. The return spring assembly may be removeable from the lock as a unit. In some embodiments, the return spring assembly may be removed without adjusting the spring tension or preload.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 shows in interior facing perspective view of a lock according to one embodiment (e.g., interior to the lock itself). A case 10 mounts onto a face of a door and forms the frame of the lock. The case 10 supports a door handle 11. A spindle 43 is engaged with the door handle 11 such that the door handle and spindle rotate together about an axis running longitudinally through the centerline of the spindle. A hub plate 41 is engaged to rotate with the spindle 43 and therefore also to rotate with the door handle 11. A spring cartridge 40 is located behind the hub plate 41 and is mostly obscured by the hub plate in the illustration. The rotational displacement of the door handle 11, the spindle 43, and the hub plate 41 is limited by the interaction of the hub plate with a stop 101. The stop 101 also serves a stationary support which engages with one end of a spring retained by the spring cartridge (see also FIGS. 4-6 and additional description of the spring below). A locking slide 20 translates vertically when actuated by a lock cylinder (not shown). The locking slide 20 may enter and engage with a recess in the hub plate to place the lock in a locked state. In the locked state, a user may not unlatch the lock by rotating the handle without first inserting a key or other credential to put the lock in an unlocked state.

Figure 2:
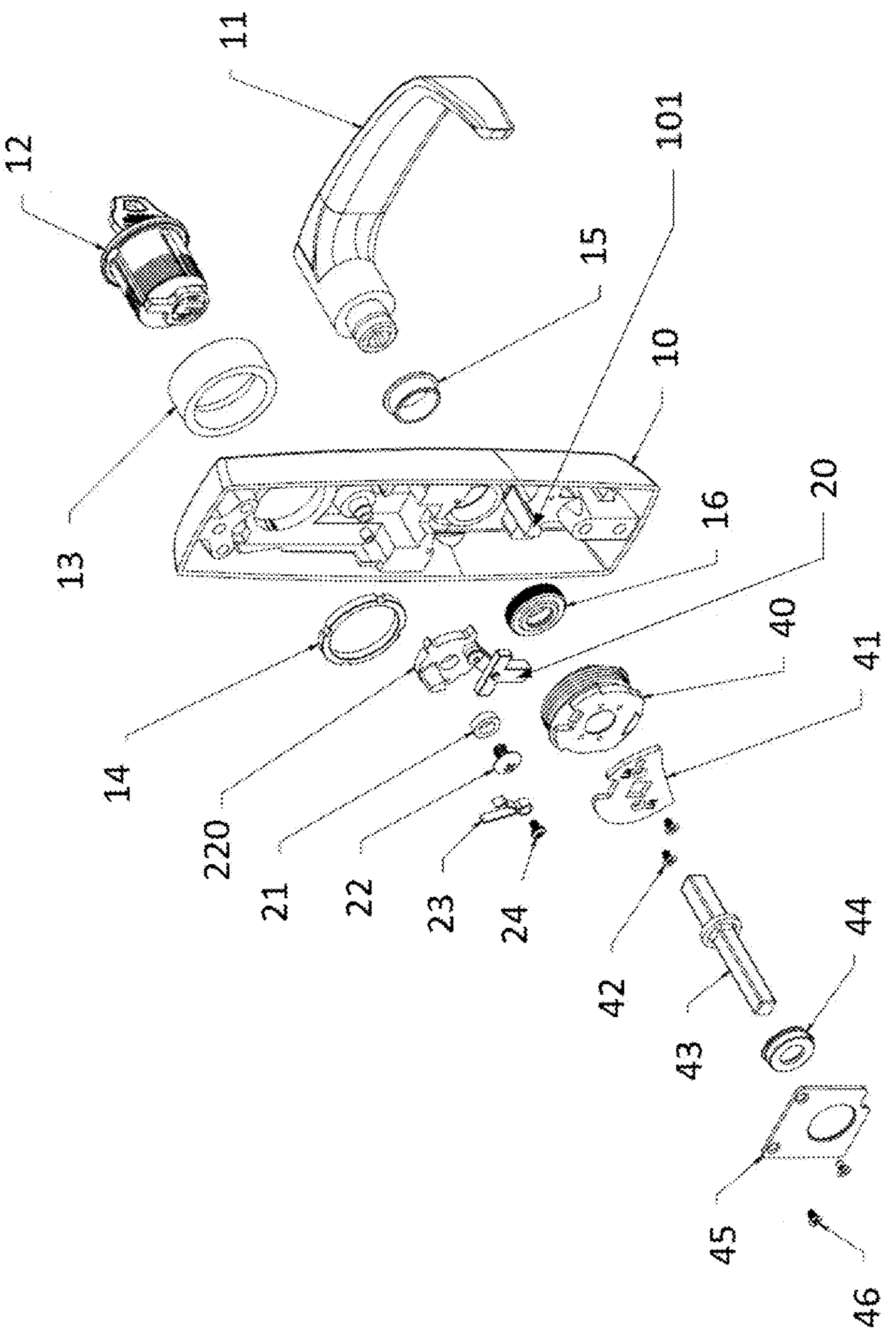
FIG. 2 depicts an exploded view of the lock embodiment illustrated in FIG. 1.

FIG. 2 depicts an exploded view of the lock embodiment illustrated in FIG. 1. As in FIG. 1, the case 10 mounts onto the face of the door and forms the frame of the lock supporting the door handle 11. A front bushing 15 serves as a bearing surface between the handle 11 and the case 10. A cap nut 16 engages with the handle 11 and supports a force on the door handle longitudinal to the axis of rotation, such as from pulling a door open. The spindle 43 engages with the door handle 11 and rotates with the door handle, the rotation being about the axis of rotation of the door handle, the axis running longitudinally through the spindle. Spring cartridge 40 is located centered about the axis, sitting around the spindle 43 but not connected directly thereto in the illustrated embodiment. The hub plate 41 engages with the spindle 43 and is removably connected to the spring cartridge 40 by screws 42.

Rotation of the door handle 11 rotates the spindle 43 which in turn rotates the hub plate 41 and a portion of the spring cartridge rigidly mounted thereto. A portion of an end of the spring within the spring cartridge (not visible in FIG. 2, see details of the spring cartridge in FIGS. 4-6) engages with the stop 101 such that the stop provides a support to one end of the spring that is stationary with the door.

The stop 101 additionally limits a rotational displacement of the hub plate 41, thereby limiting the rotational displacement of the spindle 43 and the door handle 11. Note that while the stop 101 provides a stationary support for an end of the spring in the illustrated embodiment, other embodiments are contemplated where the functions of the stop to abut the hub plate and the stationary support for the spring may be performed by separate components. The stop and stationary support for the spring may be positioned at different locations within the lock case. According to some embodiments, a stop may be a separate piece from the case and may be removeable and repositionable at different locations within the case, such as to provide an adjustment for the lock. A rear bushing 44 is retained by a spring plate 45. The spring plate 45 and bushing 44 sit over the hub plate 41 and are fastened into the case 10 by spring plate screws 46. The spindle 43 runs through the rear bushing 44. When so fastened, the spring plate 45 and rear bushing 44 retain the rigidly connected hub plate 41 and spring cartridge 40 within the lock.

A lock cylinder 12 (with a key as illustrated) fits within a ring 13, the assembly is then supported by the case 10. A cylinder nut 14 threads onto a rear portion of the lock cylinder 12 retaining the lock cylinder and ring 13 within the case 10. A locking assembly 220 is rotationally connected to the lock cylinder 12 by truss head screw 22 and a spacer 21. When the lock cylinder 12 is rotated (such as when turned with a key), the locking slide 20 translates vertically and may engage with a locking recess or slot within the hub plate 41 (see FIGS. 4-6 for the recess in the hub plate). In the illustrated embodiment, the door handle 11 may be immobilized in a locked state when the locking slide 20 is engaged with the locking recess in the hub plate. In the locked state, a user may be unable to turn the door handle and the lock may not operate to unlatch the door until the lock is put into an unlocked state such as by presenting a key or credential. According to some embodiments, the spindle 43 may be designed to serve as a first point of failure to enhance the security of the lock. For instance, if a would-be intruder were to attempt to overpower the lock, such as by applying a wrench to the handle, the spindle 43 may fail, maintaining other lock components such as the hub plate 41 and the locking slide 20 in a locked state where the door may remain latched. While the embodiment illustrated immobilizes the door handle 11 in the locked state, other embodiments are contemplated. A door handle may be configured to freewheel, that is to rotate freely without unlatching the door when in the locked state. The freewheeling function may be provided by embodiments of a hub plate and/or spindle.

According to some embodiments, locks may include electrically actuated and or/electronic locks which may not include a key cylinder. Such locks may inhibit unlatching by any suitable method, including with a locking slide as in the above embodiment. In other embodiments, locks may be used to latch interior partition doors. Interior partition doors may not require a locking functionality. In such situations, a lock may not include some components/features such as the lock cylinder, the locking slide, or the locking recess in the hub plate.

According to some embodiments, components of the lock may be made of metals including zinc alloys, aluminum alloys, copper alloys such as brass or bronze, ferrous allows, magnesium alloys or other suitable metals. Components may additionally be made from polymers including composite reinforced polymers. Components may be cast, die cast, stamped, machined, welded, injection molded, or manufactured by other process or combination of processes.

Figure 3A:
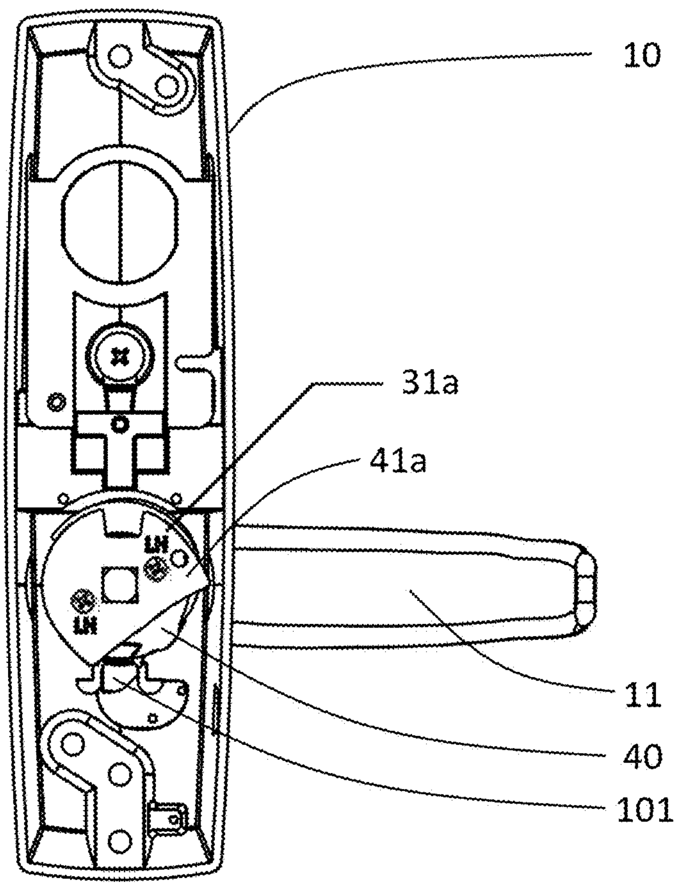
FIG. 3A shows an interior facing view of a lock according to the embodiment of FIGS. 1 and 2.

FIG. 3A shows an interior facing view of a lock according to the embodiment shown in FIGS. 1 and 2. The lock illustrated in FIG. 3A is in the left hand configuration. Hub plate 41*a* is the hub plate of FIGS. 1 and 2 illustrated in a left hand configuration. An LH marking 31*a* indicates the left hand configuration, such as may be used to guide a user/installer when rehanding the lock. All other component nomenclature is the same as FIGS. 1 and 2.

Figure 3B:
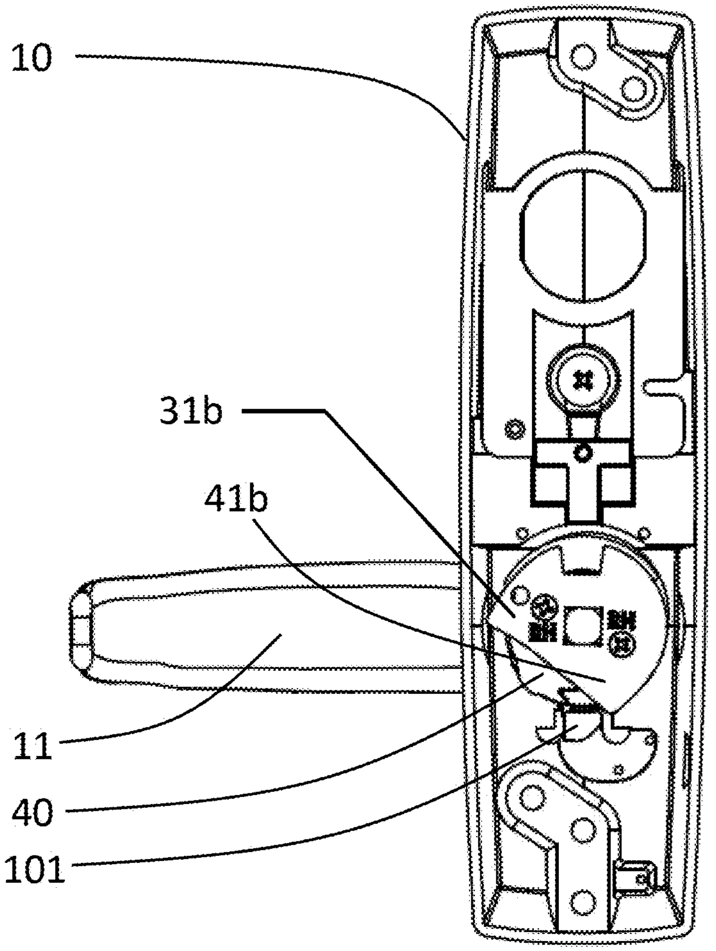
FIG. 3B shows an interior facing view of a lock according to the embodiment of FIGS. 1, and 2.

FIG. 3B shows an interior facing view of a lock according to the embodiment shown in FIGS. 1, and 2. The lock illustrated in FIG. 3B is in the right hand configuration. Hub plate 41*b* is the hub plate of FIGS. 1 and 2 illustrated in a right hand configuration. An RH marking 31*b* indicates the right hand configuration, such as may be used to guide a user/installer when rehanding the lock. All other component nomenclature is the same as FIGS. 1 and 2. It may be observed that the door handle 11 points to opposing sides in FIGS. 3A and 3B when in the free state as depicted in both figures, the handle position being reversed when rehanding a lock. It should additionally be noted that the hub plates 41*a* and 41*b* (and 41 from FIGS. 1 and 2) may be the same component removably mounted to the spring cartridge 40 in different orientations. The different orientations of the hub plate (41*a* or 41*b*) may be achieved by turning the hub plate over, for instance, the hub plate may have a first face and a second face, the second face being opposite the first face. In the first orientation the first face may abut the spring cartridge and in the second orientation the second face may abut the spring cartridge. According to other embodiments the different orientations may include different rotational orientations and/or different mounting locations on the spring cartridge.

Figure 4:
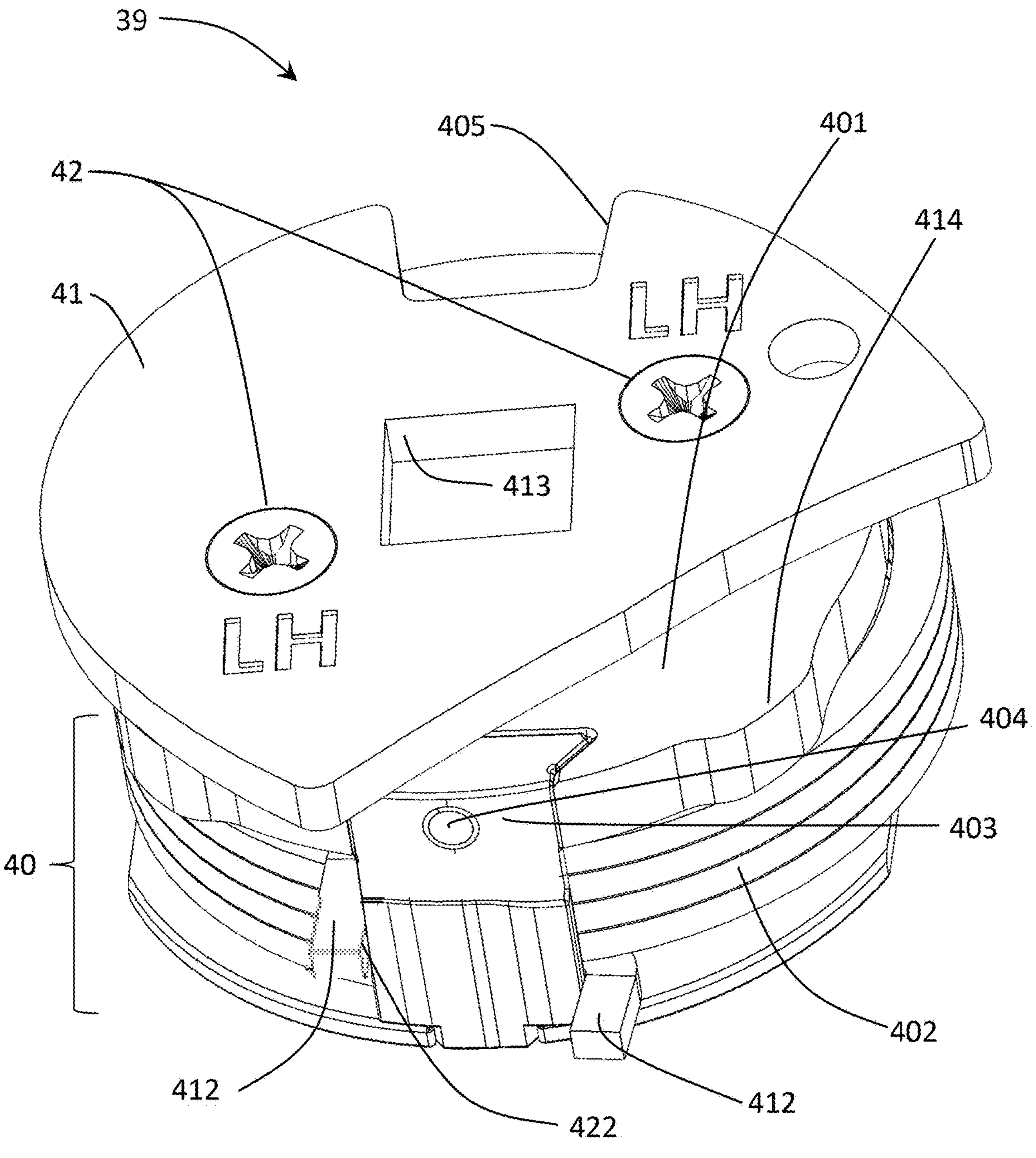
FIG. 4 shows a perspective view of a return spring assembly of the lock.

FIG. 4 shows a perspective view of return spring assembly 39 showing the hub plate 41 rigidly but removably attached to spring cartridge 40 by screws 42. The embodiment illustrated is the embodiment shown in FIGS. 1 and 2 in the left hand orientation illustrated by FIG. 3A. Hub plate 41 further includes a locking recess 405 in the form of a slot into which a locking slide may engage to put the lock in a locked state. Opening 413 is provided centered on the axis of rotation of the door handle and spindle (not shown, see FIGS. 1 and 2). Opening 413 is shaped to allow the spindle to slidably enter the opening, such as during assembly, and to rotationally connect the spindle and the hub plate 41. As illustrated in FIG. 4, the spring cartridge includes a cartridge base 401, a spring 402, a cartridge insert 403 and a pin 404. The cartridge base 401 serves as a frame or chassis of the spring cartridge. The cartridge base supports the spring 402 which runs around a perimeter of the cartridge base. The spring 402 may be a coiled torsion spring, as illustrated. The cross section of the spring 402 may be any convenient shape such as a round cross section, or a rectangular cross section. Cross section refers to a shape of a section normal to the periphery of the spring (see also FIG. 5B for a section through the spring). For instance, spring 402 is a coiled torsional spring formed from rectangular spring wire in the illustrated embodiment, the spring may be formed such as by winding spring wire into the coiled shape. In this instance, the cross section of the spring being the shape (e.g. a rectangle) normal to a longitudinal direction of the spring wire from which the spring is wound. According to some embodiments, a spring with a rectangular cross section may be used to provide a greater force within a certain space and/or to provide a better fit with the cartridge base 401. The spring 402 of the embodiment illustrated in FIGS. 4-6 has a rectangular cross section (see FIG. 5A). A square cross section is a form of rectangular cross section and may be used in some embodiments. Ends of the spring 402 are bent outward as depicted by spring ends 412. The spring 402 may be held into the cartridge base 401 by the cartridge insert 403. The cartridge insert 403 may be secured into the cartridge base 401 by the pin 404. The cartridge insert may additionally abut the spring ends 412 such as to push the spring ends apart, thereby applying a load to spring 402, resulting in a preload of the spring. The preloaded spring may exert force on the cartridge insert 403 by the spring ends 412 when the door handle is in a free state. The spring ends 412 may additionally abut a support stationary to the door such as, such as a stationary support in the case of the lock. The faces of the spring ends that abut the stationary support, faces 422 (only visible on one spring end 412 in FIG. 4) are the same faces 422 of the spring ends that abut the cartridge insert 403 in the illustrated embodiment. The stationary support may be located between the spring ends 412 adjacent and tangent to the cartridge insert 403 when the lock is in a free state (e.g. handle is in a free state). In the present embodiment, the stationary support may be the same piece as the stop (stop 101 in FIGS. 1 and 2). Tension may be added to the spring 402 by increasing a separation of the spring ends 412, such as by increasing the distance between the faces 422 of the spring ends that initially abut the cartridge insert 403. Increasing the tension in the spring 402 increases the force exerted by the spring ends 412 and may increase the restoring force applied to the door handle.

Rotating the door handle in a first direction (e.g. a clockwise direction of the handle) may rotate the cartridge base 401 to increase a force between one of the spring ends 412 and the stationary support while the other of the spring ends moves with the spring cartridge 40 in a direction away from the stationary support, adding tension to the spring 402. Rotating the door handle in a second direction (e.g. a counter-clockwise direction) will reverse which spring end is stationary and which spring end will move (as compared to rotation in the clockwise direction) and may also tension the spring. The force provided by the tensioned spring may resist the rotational displacement of the door handle and may provide a restoring force. The force provided by the spring may increase with increasing rotational displacement of the door handle away from the free state.

Specific rotation directions may apply to specific handing of the lock, for instance, in a right hand lock configuration, a user may displace the door handle in a clockwise direction (when facing the door/door handle) to unlatch the door, resulting in a clockwise displacement of the cartridge base (as viewed facing the door handle). The force in the spring 402 would be directed so as to bias rotation of the door handle back to the free state in a counter-clockwise direction if the door handle is released. In a left hand lock configuration, a user may displace the door handle in a counter-clockwise direction (when facing the door/door handle) to unlatch the door, resulting in a counter-clockwise displacement of the cartridge base (as viewed facing the door handle) and resulting in a force to bias rotation of the door handle back to the free state in a clockwise direction if the door handle is released.

The return spring assembly 39 in FIG. 4 represents one embodiment of a return spring assembly although other embodiments are contemplated. In some embodiments, the hub plate may be connected to the spring cartridge through an intermediate component. The intermediate component may be the spindle. According to some embodiments, the spindle may be a monolithic, unitary piece with the door handle. According to other embodiments the cartridge base may be a monolithic, unitary piece with the spindle. According to some embodiments, the cartridge base may be configured to engage with the spindle and to be rotationally connected therewith without the spindle engaging with the hub plate. According to some embodiments, a return spring assembly may include more than one hub plate. According to some embodiments, a hub plate may be a monolithic, unitary piece with the cartridge base. The cartridge base may include a left hand hub plate and a right hand hub plate that may be a monolithic, unitary piece with the cartridge base, where the left hand hub plate is on one face of the cartridge base and the right hand hub plate is on the opposite face of the cartridge base such that the cartridge base/return spring assembly may be removed and reoriented to an opposite face to rehand the lock.

According to some embodiments, the hub plate may be fastened to the spring cartridge including one or more pins. One or more fasteners may be used to removably connect the hub plate to the spring cartridge. The one or more fasteners may include screws, bolts, studs, nuts, clips, snap rings, tabs, spring loaded retainers, or other fasteners.

The cartridge base 401 may additionally include cams 414 disposed at locations around the periphery of the cartridge base. In some embodiments of the lock, one or more microswitches or electrical contacts may be disposed within the lock and configured to contact one or more cams 414 at certain rotational positions of the spring cartridge/door handle (see also FIG. 8). Other embodiments of the lock may not include microswitches. Cams 414 may be present on cartridge base 401 even if microswitches are not used.

Figure 5A:
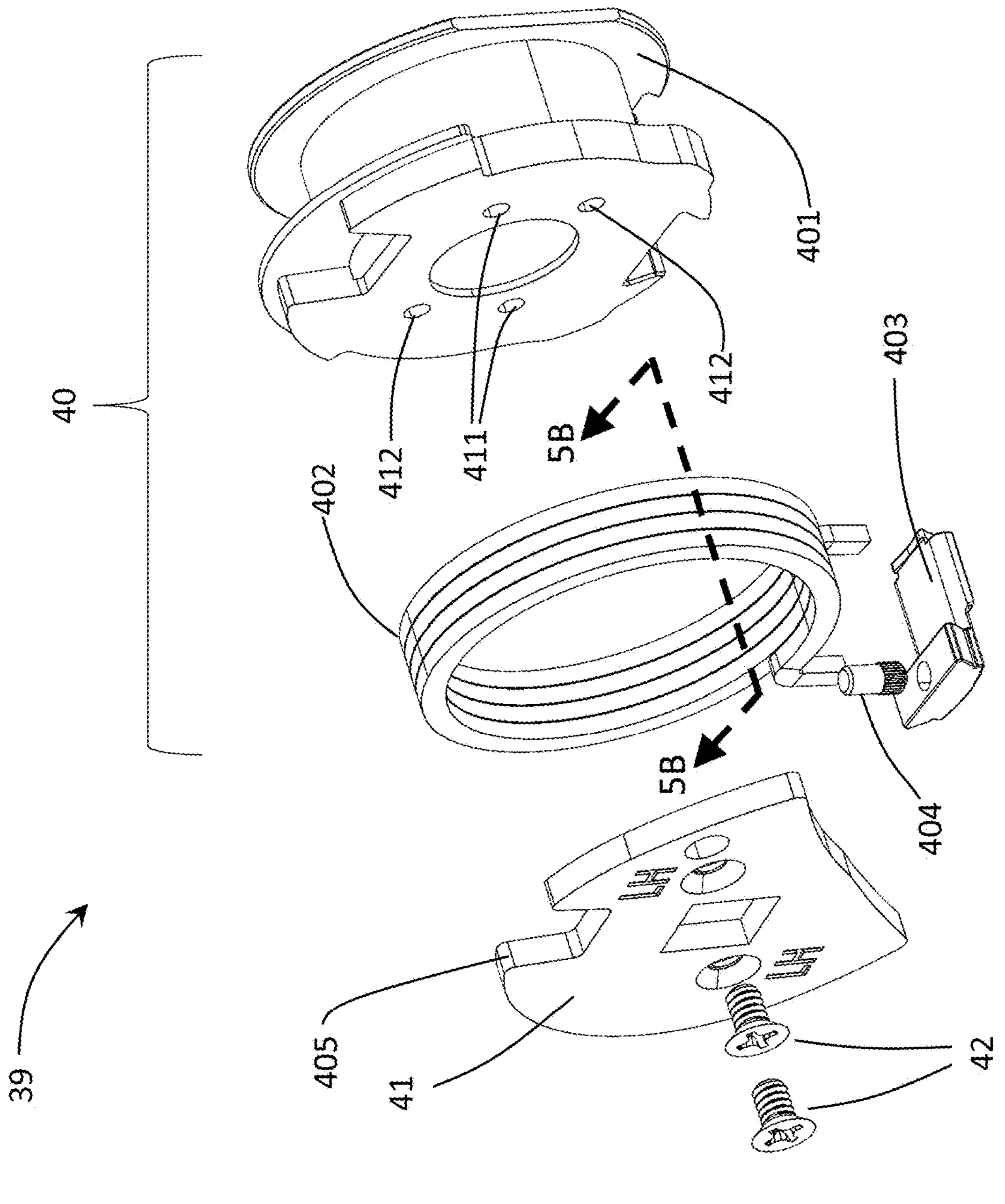
FIG. 5A shows an interior facing exploded perspective view of the return spring assembly of FIG. 4.

FIG. 5A shows an interior facing exploded perspective view of the return spring assembly 39 of the embodiment depicted in FIG. 4. The hub plate 41 is removably connected with the spring cartridge 40 by screws 42. As illustrated, the return spring assembly 39 is in the left hand lock configuration. LH markings on the hub plate 41 will be visible on the assembled return spring assembly. In the left hand lock configuration, screws 42 are configured to engage with threaded holes 411 in the cartridge base 401 of the spring cartridge 40. Threaded holes 412 are unused in the left hand lock configuration and are provided for configuring the return spring assembly for a right hand lock configuration. Similarly, if the return spring assembly is handed for the right hand lock configuration, screws 42 will engage with threaded holes 412 and threaded holes 411 will be unused.

Figure 5B:
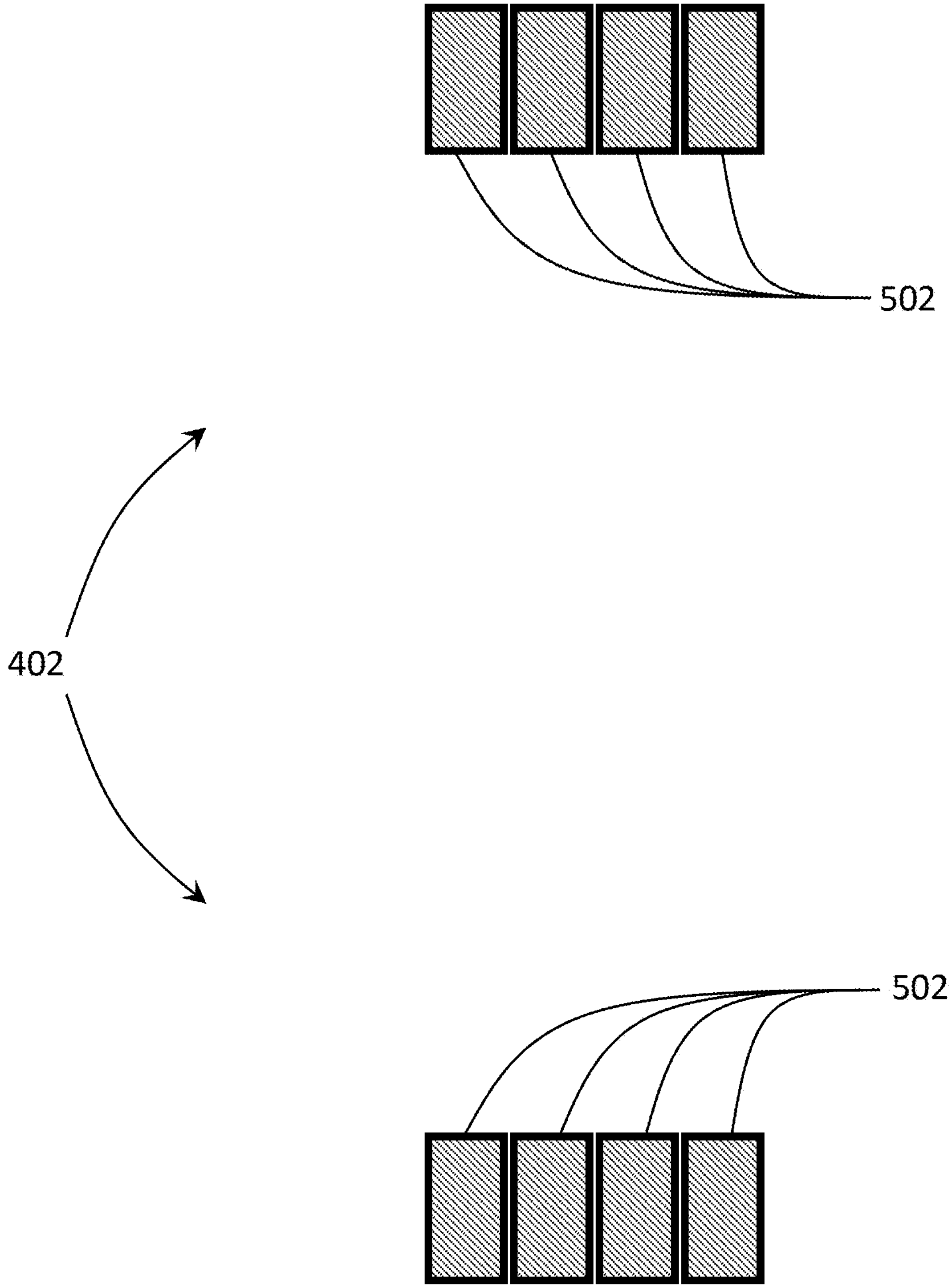
FIG. 5B shows a section view through a spring illustrated in FIG. 5A.

FIG. 5B shows a section view through the spring 402 illustrated in FIGS. 4 and 5A. The cross section 502 of spring 402 is rectangular in the illustrated embodiment. Spring 402 is shown with a four loop coil although springs with more or fewer coil loops are also contemplated.

Figure 6:
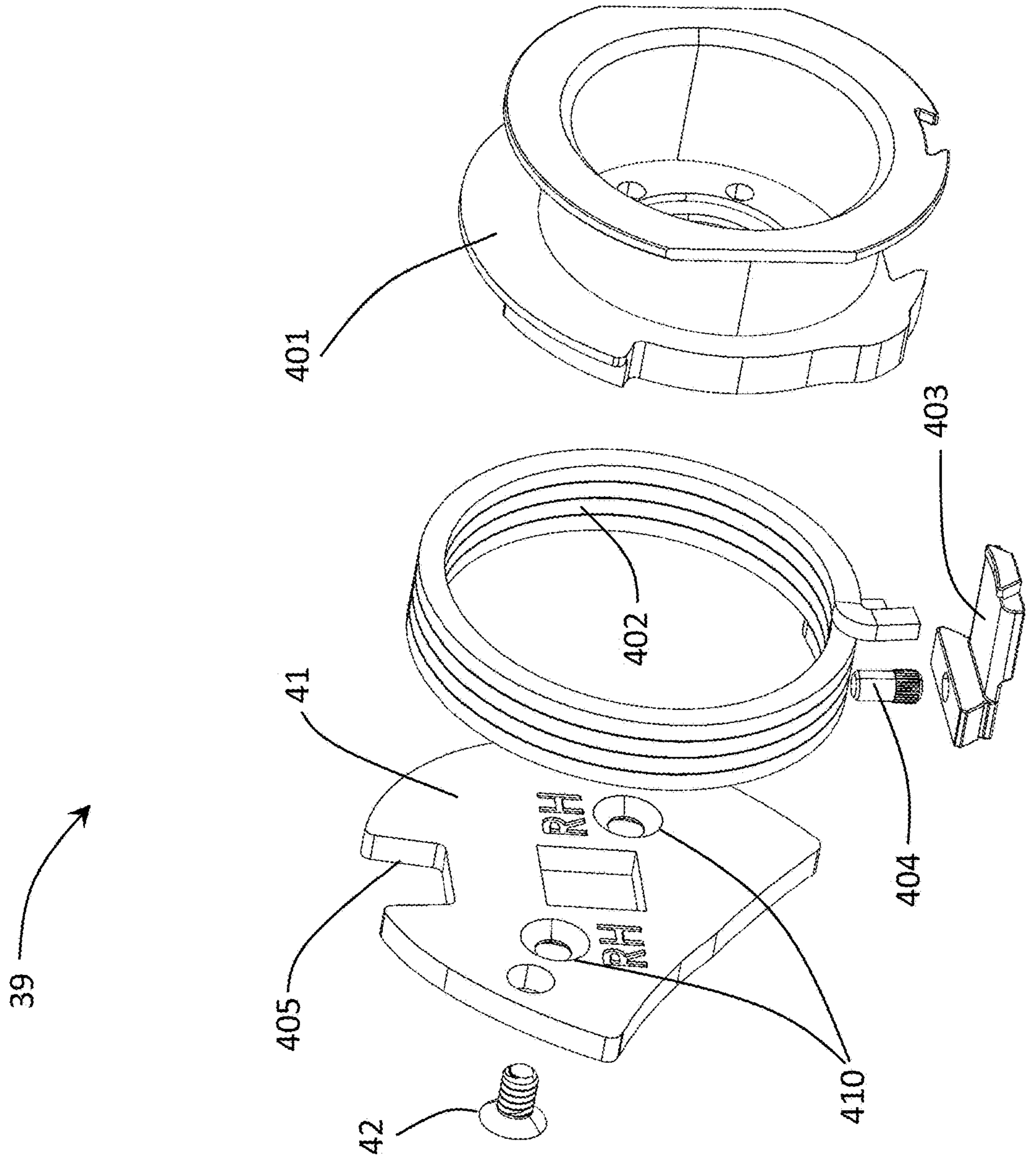
FIG. 6 shows an exterior facing exploded perspective view of the return spring assembly of the embodiment depicted in FIG. 4.

FIG. 6 shows an exterior facing exploded perspective view of the return spring assembly 39 of the embodiment depicted in FIG. 4. The return spring assembly 39 is in the left hand lock configuration as in FIG. 5. The hub plate 41 is viewed from direction of the face abutting the cartridge base 401. The RH marking will be covered by the cartridge base 401 and will not be visible when the hub plate 41 and cartridge base 401 are assembled. Only the LH marking will be visible on the assembled return spring assembly 39. Screws 42 (only one is visible) will pass through clearance holes 410 in the hub plate 41 and engage with threaded holes in the cartridge base 401 as shown in FIG. 5. It should be noted that clearance holes 410 may be countersunk for the screws 42 on both the RH and LH faces of the hub plate 41 (see also FIG. 5) to allow the screws to be inserted from either side of the hub plate.

Figure 7A:
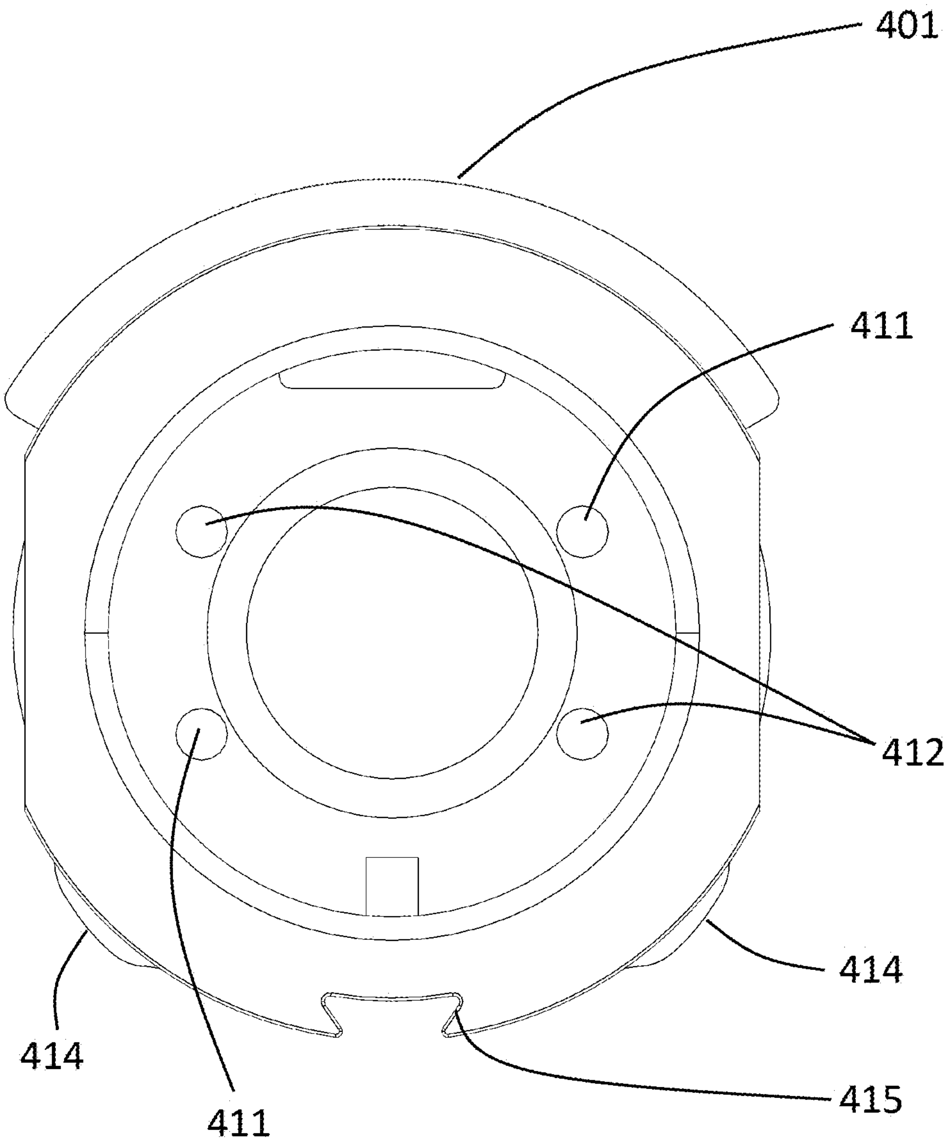
FIG. 7A illustrates an exterior facing view of a cartridge base of a lock.
Figure 7B:
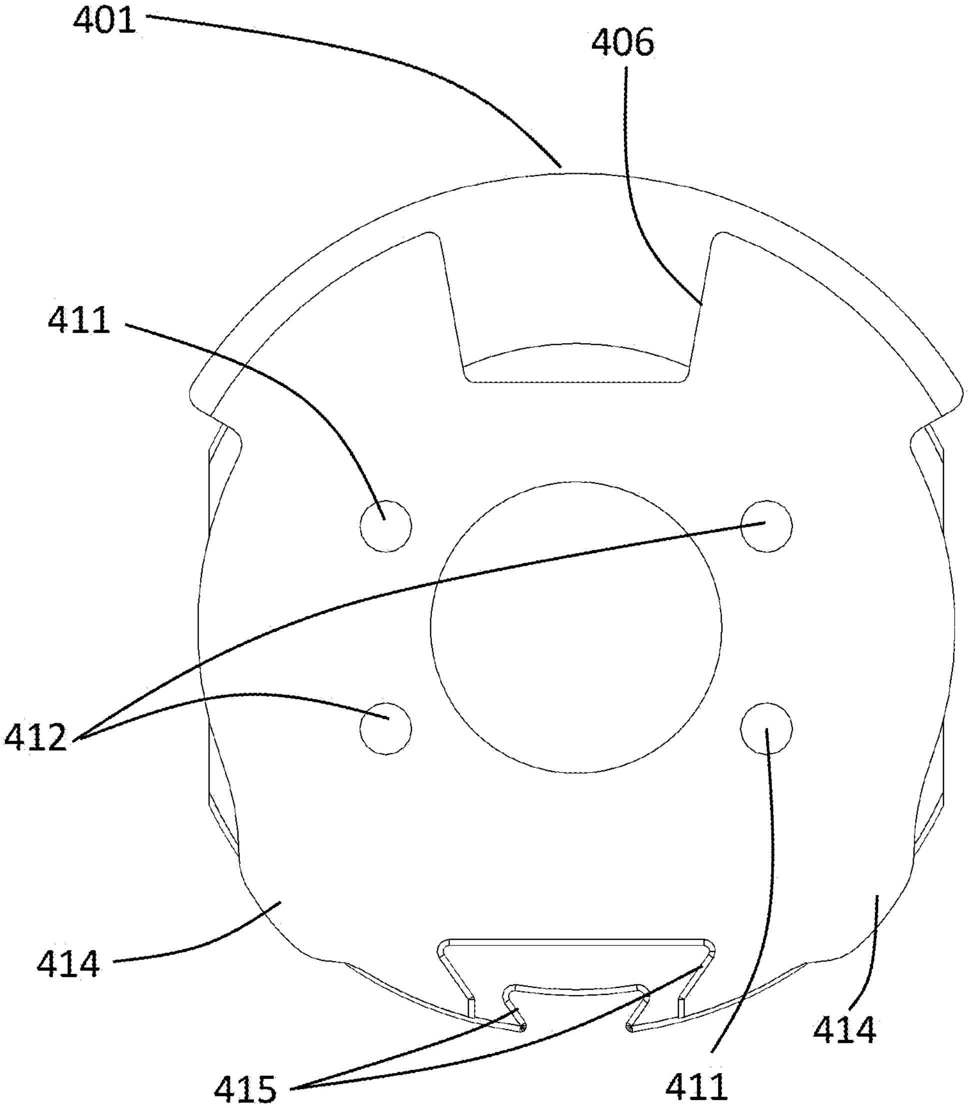
FIG. 7B illustrates an interior facing view of the cartridge base.

FIG. 7A illustrates an exterior facing view of cartridge base 401. FIG. 7B illustrates an exterior facing view of cartridge base 401. A recess 406 aligns with the locking recess in the hub plate. The locking slide may enter recess 406 along with the previously described locking recess in the hub plate when the lock is in a locked state. Dovetails 415 are provided to receive the cartridge insert. The cartridge insert (see 403 FIGS. 4-6) may slidably engage with the dovetails 415 and may be held in place by a pin (see 404 FIGS. 4-6). Cams 414 are visible to engage with a microswitch (not shown).

Figure 8:
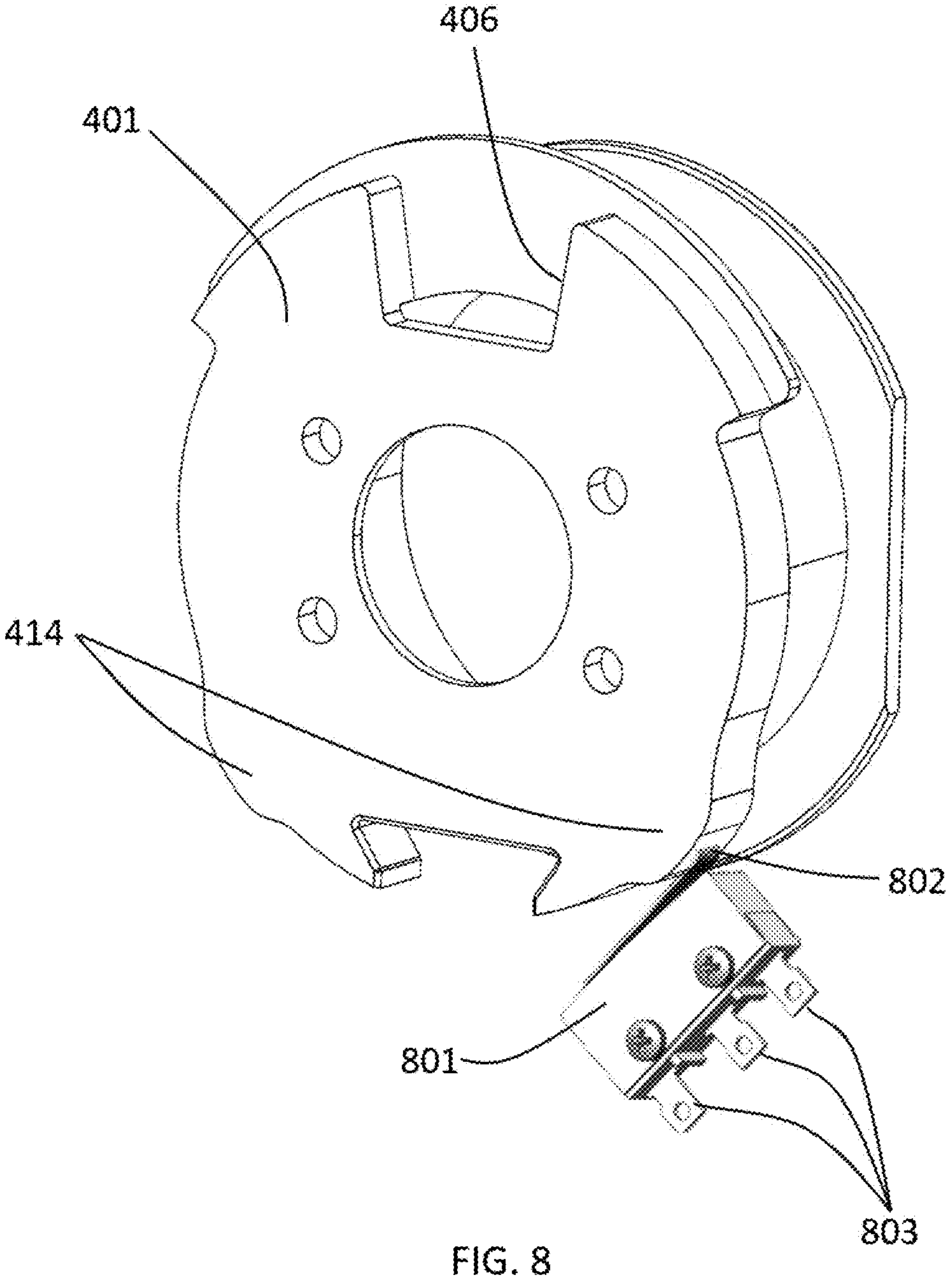
FIG. 8 shows a perspective view of the cartridge base cooperating with a microswitch.

FIG. 8 shows a perspective view of the cartridge base 401 including a microswitch 801 contacting one of the cams 414. A contact arm 802 of microswitch 801 rides on one of cams 414. The contact arm 802 operates the microswitch 801 such that an electrical continuity between electrical terminals 803 is changed when contact arm 802 slides off or onto one of cams 414. The change in electrical continuity between the electrical terminals 803 may be used to identify a rotational position of the cartridge base 401 which may identify the rotational position of a door handle of the lock.

Figure 9:
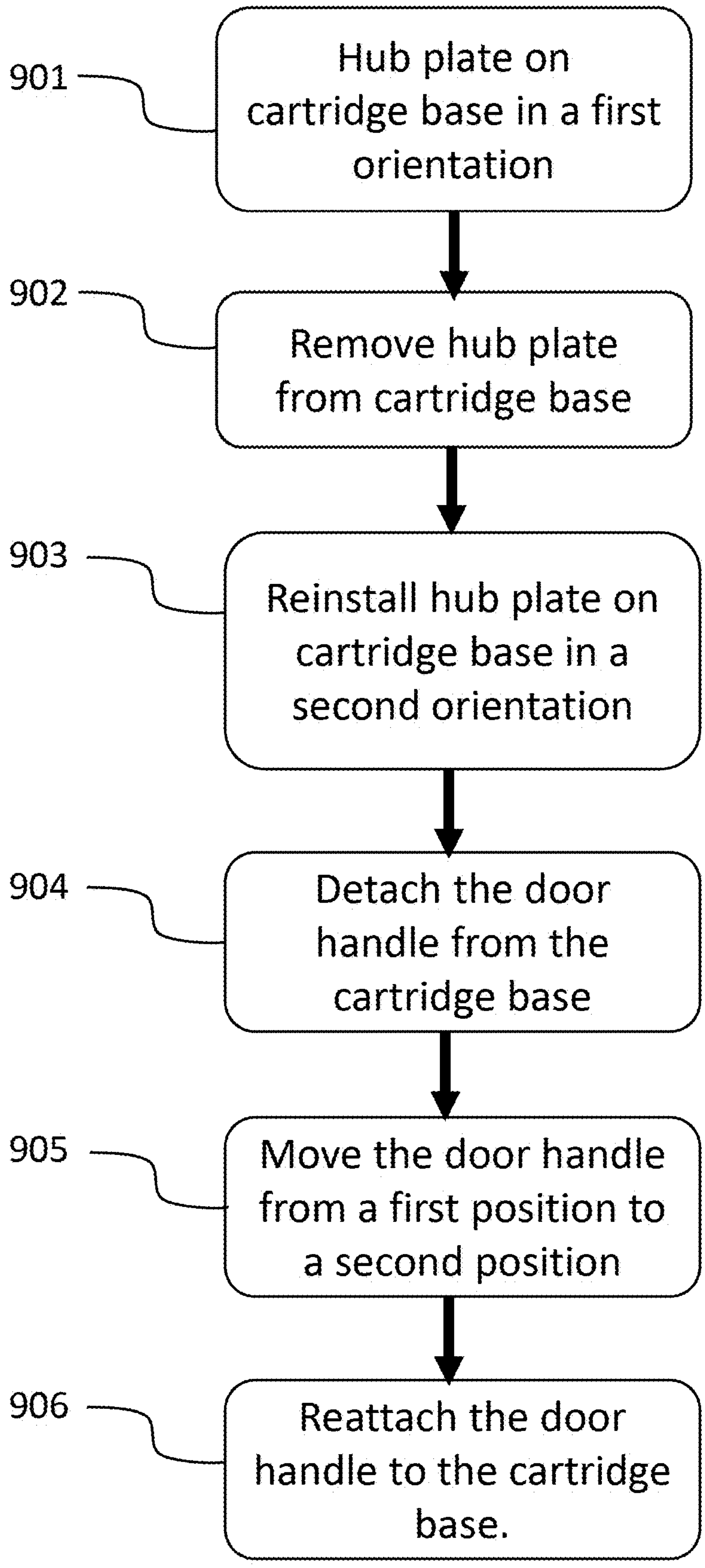
FIG. 9 shows a block diagram for a method of rehanding a lock according to some embodiments.

FIG. 9 shows a block diagram for a method of rehanding a lock according to some embodiments. Initially a lock may be handed such that rotating the door handle with respect to the lock in a first direction unlatches the lock. The lock may have a hub plate on a cartridge base in a first orientation 901. The hub plate may have a right or left hand orientation as the first orientation. The hand of the first orientation may be determined by reading a marking visible on the hub plate when the hub plate is installed on the cartridge base/spring cartridge. The initial hand of the lock may be the configuration of the lock as received/purchased, or the lock may have been previously assembled and/or installed such as on a different door. The hub plate may be removed from the cartridge base 902. To rehand the lock, the hub plate may be reinstalled on the cartridge base in a second orientation 903, the second orientation being different from the first orientation. In the second orientation, a marking may be visible on the hub plate indicating the desired hand of the lock (e.g., a marking LH, RH, etc.). The door handle may be detached from the cartridge base 904. The door handle may then be moved from a first position to a second position 905, where the second position is different from the first position. The second position corresponds with the door handle position of the desired hand of the lock. The door handle is then reattached to the cartridge base 906. The lock may now be unlatched by rotating the door handle with respect to the lock in a second direction, the second direction being different from the first direction and rotationally opposite of the first direction.

According to some embodiments, a lock may be rehanded by repositioning the door handle prior to reorienting the hub plate. For instance, steps 904-906 of FIG. 9 may precede steps 902 and 903 of FIG. 9. This disclosure is not to be so limiting.

According to some embodiments, the method of rehanding the lock may include turning the hub plate between the first orientation and the second orientation and reattaching it to the cartridge base with screws. For instance, the method may remove screws from a first set of holes with the hub plate in a first orientation. Once removed, the hub plate may be turned between the first orientation and a second orientation. The hub plate may have a first face and a second face, the second face being opposite the first face. In the first orientation the first face may abut the cartridge base and in the second orientation the second face may abut the cartridge base. The hub plate may be reinstalled in the second orientation by reinstalling the screws in a second set of holes with the hub plate in a second orientation. The second set of holes may be different from the first set of holes. According to some embodiments, one or more holes may be shared in common between the first set of holes and the second set of holes, such that a shared hole may engage a screw with the hub plate in either the first orientation or the second orientation. According to some embodiments, one or more holes of the first set of holes may be unique to the first set of holes and one or more holes of the second set of holes may be unique to the second set of holes. The unique holes may be in the cartridge base and/or the hub plate and may be threaded holes or unthreaded holes.

According to some embodiments, a spring cartridge or return spring assembly may be removed when a lock is rehanded, such as to loosen a nut for the purpose of repositioning the door handle. In some embodiments, the spring cartridge may have the same orientation in the lock before and after rehanding. Other embodiments are contemplated where a spring cartridge may be flipped or rotationally repositioned when a lock is rehanded.

It should be appreciated that while embodiments disclosed herein may be related to door locks including lever type door handles, this disclosure is not so limited to lever type door handles. A door handle may be a door knob or other shape configured to receive a tactile input from a user to unlatch a door. Additionally, in some applications, such as cabinets etc., a lever type door handle may have a free state where a door handle is in a position other than a horizontal position, this disclosure is not limited as to a position of a door handle when the door handle is in a free state.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A return spring assembly for a door handle of a door lock, comprising:

a cartridge base configured to rotate with the door handle;

a spring retained by the cartridge base; and a hub plate comprising a first face and a second face opposite the first face, the hub plate configured to mount rigidly with the cartridge base in one of a first orientation or a second orientation, wherein with the hub plate mounted in the first orientation, the first face abuts the cartridge base and a force exerted by the spring increases when the door handle is rotated in a clockwise direction, and with the hub plate mounted in the second orientation, the second face abuts the cartridge base and a force exerted by the spring increases when the door handle is rotated in a counterclockwise direction.

2. The return spring assembly for a door handle of claim 1, wherein the spring is a torsion spring.

3. The return spring assembly for a door handle of claim 2, wherein the torsion spring has a rectangular cross section.

4. The return spring assembly for a door handle of claim 2, wherein the torsion spring further includes a first end and a second end, and wherein one of the first end and the second end is engaged by the cartridge base and the other of the first end and the second end is configured to engage a stationary support within the door lock.

5. The return spring assembly for a door handle of claim 1, wherein the hub plate is mounted to the cartridge base with at least one fastener and wherein the cartridge base and the hub plate are configured to allow the hub plate to be oriented in one of the first orientation and the second orientation, wherein the at least one fastener is configured to be removed, the hub plate is configured to be reoriented from the first orientation to the second orientation.

6. The return spring assembly for a door handle of claim 2, wherein the torsion spring is configured with a preload within the cartridge base.

7. The return spring assembly for a door handle of claim 1, wherein the hub plate is mounted to the cartridge base through an intermediate component.

8. A lock comprising:

a door handle configured to rotate about an axis;

a case configured to mount on a door and to rotatably support the door handle;

a spindle, engaged with the door handle and configured to rotate therewith;

a spring cartridge; and a hub plate removably attached to the spring cartridge and configured to engage with the spindle and rotate therewith, wherein relative movement between the hub plate and the spring cartridge is prohibited, wherein the case additionally comprises a stop configured to contact the hub plate at certain rotational positions of the hub plate to limit a rotational displacement of the door handle, and wherein the hub plate may be removably attached to the spring cartridge in a first orientation or in a second orientation, when the hub plate is removably attached to the spring cartridge in the first orientation the door handle is configured to rotate about the axis in a first direction to unlatch the lock, when the hub plate is removably attached to the spring cartridge in the second orientation the door handle is configured to rotate about the axis in a second direction to unlatch the lock, the first direction being different from the second direction.

9. The lock of claim 8, wherein the hub plate has a first face and a second face, the second face being opposite the first face, wherein in the first orientation, the first face abuts the spring cartridge and in the second orientation the second face abuts the spring cartridge.

10. The lock of claim 8, further comprising at least one fastener, wherein the hub plate is removably connected to the spring cartridge by the at least one fastener.

11. The lock of claim 10, wherein the at least one fastener includes two screws, wherein at least one of the hub plate and the spring cartridge include a first set of holes and a second set of holes, wherein the two screws are in the first set of holes with the hub plate in a first orientation, and the two screws are in the second set of holes with the hub plate in a second orientation, wherein one or more holes of the first set of holes are unique to the first set of holes and one or more holes of the second set of holes are unique to the second set of holes.

12. The lock of claim 8, wherein the spring cartridge further comprises a torsional spring, and wherein the torsional spring has a rectangular cross section.

13. The lock of claim 8, additionally comprising a microswitch, and wherein the spring cartridge further comprises at least one cam configured to contact the microswitch at certain rotational positions of the spring cartridge.

14. The lock of claim 8, additionally comprising:

a locking slide configured to engage a locking recess in the hub plate when the lock is in a locked state;

a lock cylinder configured to move the locking slide into engagement with the locking recess in the locked state and to move the locking slide out of engagement with the locking recess of the hub plate when the lock is in an unlocked state.

15. The lock of claim 8, wherein the spring cartridge additionally comprises a cartridge base configured to support a spring and wherein the spindle is a unitary piece with the cartridge base.

16. The lock of claim 8, wherein the hub plate is connected to the spring cartridge through at least one intermediate component.

17. The lock of claim 8, wherein the lock is configured to allow a user to rotate the door handle and wherein the lock has an unlocked state wherein turning the door handle will enable a user to unlatch the door and a locked state wherein a user will not be able to unlatch the door by rotating the door handle.

18. A lock comprising:

a door handle configured to rotate about an axis;

a stop configured to limit a rotation of the door handle about the axis;

a return spring assembly configured to provide a force resisting the rotation of the door handle about the axis, wherein the return spring assembly further comprises:

a spring;

a cartridge base connected to rotate with the door handle and configured to support the spring; and a hub plate connected to rotate with the cartridge base and configured to abut the stop, wherein the hub plate abutting the stop defines a maximum angular displacement of the door handle, wherein the hub plate has a right hand orientation configured to put the lock in a right hand lock configuration when the hub plate is installed to abut the stop in the right hand orientation, wherein the hub plate has a left hand orientation configured to put the lock in a left hand lock configuration when the hub plate is installed to abut the stop in the left hand orientation, and wherein in a right hand lock configuration a user unlatches the lock by rotating the door handle about the axis in a clockwise direction and in a left hand lock configuration a user unlatches the lock by rotating the door handle about the axis in a counter-clockwise direction.

19. The lock of claim 18, wherein the hub plate has a first face and a second face, the second face being opposite the first face, and in the right hand orientation the first face abuts the cartridge base, and in the left hand orientation the second face abuts the cartridge base.

20. The lock of claim 18, wherein the spring is a torsional spring, and wherein the torsional spring has a rectangular cross section.

21. The lock of claim 18, wherein the hub plate is connected to the cartridge base through at least one intermediate component.

22. The lock of claim 18, wherein the hub plate is mounted to the cartridge base with at least one fastener and wherein the cartridge base and the hub plate are configured to allow the hub plate to be oriented in one of the right hand orientation and the left hand orientation, wherein the at least one fastener is configured to be removed, the hub plate is configured to be reoriented from the right hand orientation to the left hand orientation.

23. A method for rehanding a lock, the method comprising:

removing a hub plate from a cartridge base, the hub plate being initially attached in a first orientation;

fixing the hub plate to the cartridge base, the hub plate being reinstalled in a second orientation different from the first orientation, wherein in the first orientation, a first face of the hub plate abuts the cartridge base, and wherein in the second orientation, a second face of the hub plate opposite the first face abuts the cartridge base;

detaching a door handle from the cartridge base;

moving the door handle from a first position to a second position different from the first position; and reattaching the door handle to the cartridge base.

24. The method of claim 23 further comprising:

unlatching the lock by rotating the door handle in a first direction when the hub plate is in the first orientation and the door handle is in the first position; and unlatching the lock by rotating the door handle in a second direction when the hub plate is in the second orientation and the door handle is in the second position, the first direction being different from the second direction.

25. The method of claim 23 further comprising turning the hub plate between the first orientation and the second orientation, wherein in the first orientation the first face directly engages the cartridge base and in the second orientation the second face directly engages the cartridge base.

26. The method of claim 23 further comprising:

removing screws from a first set of holes with the hub plate in the first orientation; and reinstalling the screws in a second set of holes with the hub plate in the second orientation, wherein one or more holes of the second set of holes are unique to the second set of holes.

* * * * *